(12) United States Patent
White

(10) Patent No.: US 11,560,191 B2
(45) Date of Patent: Jan. 24, 2023

(54) TRACTION DEVICES FOR ELASTOMERIC TRACKS, AND RELATED METHODS

(71) Applicant: Performance Kennels & Stable LLC, Magna, UT (US)

(72) Inventor: Gregory White, Magna, UT (US)

(73) Assignee: Performance Kennels & Stables LLC, Magna, UT (US)

( * ) Notice: Subject to any disclaimer, the term of this patent is extended or adjusted under 35 U.S.C. 154(b) by 476 days.

(21) Appl. No.: 16/795,406

(22) Filed: Feb. 19, 2020

(65) Prior Publication Data

US 2021/0253186 A1    Aug. 19, 2021

(51) Int. Cl.
*B62D 55/28* (2006.01)
*B62D 55/32* (2006.01)
*B62D 55/24* (2006.01)

(52) U.S. Cl.
CPC ........... *B62D 55/28* (2013.01); *B62D 55/286* (2013.01); *B62D 55/32* (2013.01); *B62D 55/244* (2013.01)

(58) Field of Classification Search
CPC ....... B62D 55/286; B62D 55/32; B62D 55/24
See application file for complete search history.

(56) References Cited

U.S. PATENT DOCUMENTS

| | | | |
|---|---|---|---|
| 1,451,872 A | 4/1923 | French | |
| 1,501,937 A | 7/1924 | Benjamin | |
| 4,109,971 A * | 8/1978 | Black | B62D 55/275 305/51 |
| 4,258,463 A | 3/1981 | Lindquist | |
| 6,799,815 B2 | 10/2004 | Krishnan et al. | |
| 7,901,015 B1 | 3/2011 | Anderson | |
| 8,016,369 B2 | 9/2011 | Breton et al. | |
| 8,424,981 B1 * | 4/2013 | Stratton, Jr. | B62D 55/286 305/191 |
| 8,628,152 B2 | 1/2014 | Delisle et al. | |
| 9,878,750 B2 | 1/2018 | Leblanc et al. | |
| 9,950,757 B2 | 4/2018 | Tibbits | |
| 10,421,508 B2 | 9/2019 | Blackburn | |
| 2003/0184157 A1 * | 10/2003 | McNutt | B62D 55/286 305/180 |
| 2006/0232130 A1 | 10/2006 | Hansen | |
| 2010/0193263 A1 | 8/2010 | Kaiser et al. | |

FOREIGN PATENT DOCUMENTS

| | | |
|---|---|---|
| CA | 2511866 | 1/2007 |
| EP | 1518719 A1 | 8/2004 |

* cited by examiner

*Primary Examiner* — Tony H Winner
(74) *Attorney, Agent, or Firm* — TraskBritt

(57) ABSTRACT

A traction device for an elastomeric track comprises a first bracket comprising a first portion comprising a tapered surface and a second portion configured to be removably coupled to the first portion to define a U-shaped channel configured to receive at least a portion of an elastomeric track, a first chain coupled to the first bracket at a first end of the first chain, a second bracket coupled to a second end of first chain opposite the first bracket, and a plate coupled to the first chain between the first bracket and the second bracket, the plate configured to substantially prevent the first chain from entering the recesses of the elastomeric track. Related traction devices and methods of attaching a traction device to an elastomeric track are also disclosed.

20 Claims, 11 Drawing Sheets

TRACTION DEVICES FOR ELASTOMERIC TRACKS, AND RELATED METHODS

FIELD

Embodiments of the disclosure relate generally to traction devices for elastomeric tracks, and to related methods. More particularly, embodiments of the disclosure relate to traction devices for elastomeric tracks, and to related methods for improving the traction of the elastomeric tracks without damaging (e.g., drilling through or compromising the integrity of) the elastomeric tracks.

BACKGROUND

Numerous types of vehicles are frequently used on terrain over which it is difficult for pneumatic tires to operate. For example, military vehicles, such as tanks and other armored vehicles, and civilian vehicles, such as tractors, forest machinery, construction machinery, and recreational vehicles, are utilized on terrains with little traction, such as surfaces including sand, wet surfaces, soft surfaces, and surfaces covered with snow or ice. Generally, pneumatic tires are not capable of efficient operation on such surfaces as they tend to dig into the surface rather than riding across the surface.

In order to provide vehicles that efficiently travel over soft surfaces, especially on inclined surfaces, vehicles using endless track have been developed. Conventional endless tracks may comprise metallic tracks, or may comprise an elastomeric material. Metallic tracks may be heavy and cause damage to roads and other surfaces over which they run, and are generally used for relatively heavier equipment, such as large excavators. However, such metallic tracks are heavy, noisy, prone to vibration, and may not be usable on roads. For example, metallic tracks may damage road surfaces on which they are used.

To overcome the problems associated with metallic tracks, elastomeric tracks have been developed. However, elastomeric tracks may suffer from reduced traction on inclined surfaces, such as icy, muddy, snowy, soft, or other slippery surfaces.

BRIEF SUMMARY

Embodiments disclosed herein relate to traction devices for elastomeric tracks, and to related methods for improving the traction of the elastomeric tracks without damaging the elastomeric tracks. For example, in accordance with one embodiment, a traction device comprises a first bracket comprising a first portion comprising a tapered surface and a second portion configured to be removably coupled to the first portion to define a U-shaped channel configured to receive at least a portion of an elastomeric track, a first chain coupled to the first bracket at a first end of the first chain, a second bracket coupled to a second end of first chain opposite the first bracket, and a plate coupled to the first chain between the first bracket and the second bracket, the plate configured to substantially prevent the first chain from entering the recesses of the elastomeric track.

Additional embodiments are directed to a traction device for an elastomeric track comprising a first bracket comprising a first portion and a second portion operably attached to the first portion, the first portion and the second portion defining a U-shaped channel sized and shaped to receive a portion of an elastomeric track, the first portion comprising a tapered surface corresponding to recesses of the elastomeric track, a first chain coupled to the first bracket, and a second bracket comprising an integral member defining a U-shaped channel, the second bracket coupled to the first chain.

In accordance with additional embodiments of the disclosure, a method of attaching a traction device to an elastomeric track comprises placing at least a portion of an elastomeric track within a U-shaped channel of a second bracket of a traction device. The traction device comprises a first bracket comprising a tapered surface comprising a first portion and a second portion configured to be removably coupled to the first portion to define a U-shaped channel configured to receive at least a portion of an elastomeric track, a first chain coupled to the first bracket at a first end of the first chain, the second bracket coupled to a second end of the first chain opposite the first bracket, and a plate coupled to the first chain between the first bracket and the second bracket, the plate configured to substantially prevent the first chain from entering the recesses of the elastomeric track. The method further comprises placing the first portion adjacent to an outer surface and a side surface of the elastomeric track, placing the second portion adjacent to an inner surface of the elastomeric track, and coupling the first portion to the second portion while a portion of the elastomeric track is within a recess defined by the first portion and the second portion.

DETAILED DESCRIPTION

Figure 1A:
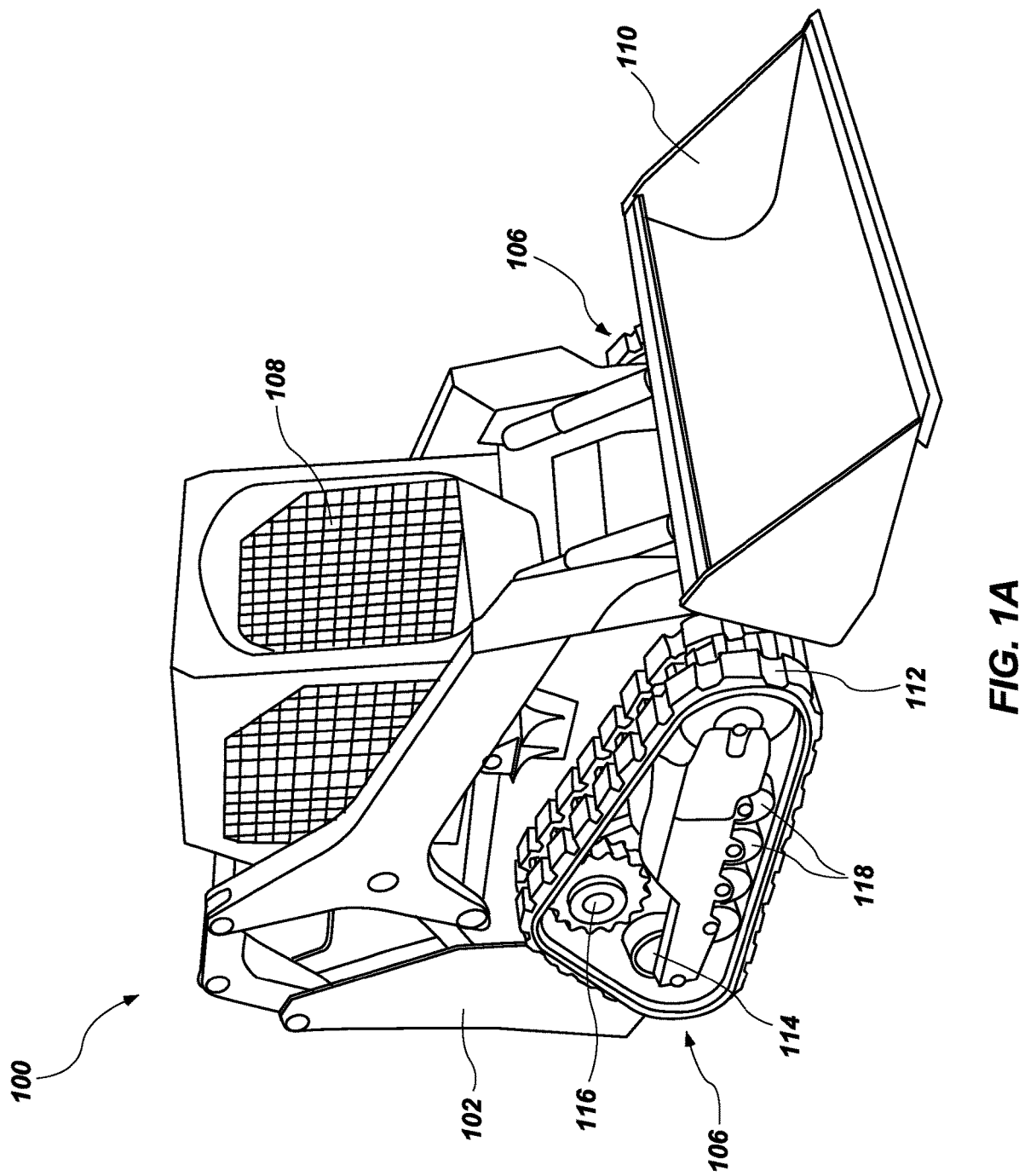
FIG. 1A is a simplified perspective view of a vehicle, in accordance with some embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for forming a traction device or for installing a traction device on an elastomeric track. Only those process acts and structures necessary to understand the embodiments of the disclosure are described in detail below. Additional acts to form a traction device and improve the traction of an elastomeric track may be performed by conventional techniques. Further, any drawings accompanying the present application are for illustrative purposes only and, thus, are not drawn to scale. Additionally, elements common between figures may retain the same numerical designation.

According to embodiments described herein, a traction device for an elastomeric track may be removably attached to the elastomeric track. The traction device includes a chain coupled between a first bracket and at least a second bracket. The first bracket may define a generally U-shaped recess configured to receive the elastomeric track. The first bracket may include a first portion operably coupled to a second portion, the first portion and second portion defining a U-shaped cavity sized and shaped to receive a portion of the elastomeric track when operably coupled together. The first portion may include at least one surface defined by (e.g., having) angled or tapered edges corresponding to (e.g., matching) a shape of recesses (e.g., grooves or channels) of the elastomeric track and configured to be disposed within and interact with the recesses. The at least one surface may be configured to wedge the first bracket into the recesses of the elastomeric track and may be configured to maintain the first bracket in contact with the elastomeric track. A chain may be coupled to the first bracket and configured to extend over the elastomeric track and couple to the second bracket on an opposite side of the elastomeric track than the first bracket. The second bracket may include at least a portion configured to receive at least a portion of the elastomeric track. In some embodiments, the second bracket has substantially the same size and shape as the first bracket and may define a U-shaped channel sized and shaped to receive at least a portion of the elastomeric track. The second bracket may include at least one surface including tapered edges corresponding to (e.g., matching) a shape of the recesses of the elastomeric track and configured to be disposed within and interact with the recesses. In some embodiments, the second bracket comprises an integral (e.g., unitary) member. In some embodiments, the chain is coupled to a plate located between the first bracket and the second bracket. The plate may be configured to facilitate contact between the chain and the ground during use and operation of the traction device. For example, the plate may substantially prevent at least some portions of the chain from entering the recesses of the elastomeric track, which would otherwise reduce the traction created by the traction device. Stated another way, the plate may facilitate contact between the chain and the ground during use and operation of the traction device. In other embodiments, the traction device does not include the plate.

The traction device may be installed to the elastomeric track by placing the U-shaped channel of the second bracket around an outer edge of the elastomeric track, extending the traction device over the elastomeric track, and attaching the first bracket to an opposite side of the elastomeric track. The first bracket may be attached to the elastomeric track by placing the first portion adjacent to the elastomeric track, a portion of the first portion extending over the external surfaces of the elastomeric track and another portion of the first portion extending over sides of the elastomeric track, and attaching the second portion of the first bracket to the first portion. Accordingly, the traction device may be coupled to the elastomeric track without forming openings (e.g., bolt holes) in the elastomeric track and without using a pry bar to stretch the traction device over the elastomeric track. In addition, the traction device does not include any bolts or fastening means that are exposed to surfaces on which the elastomeric track contacts during use and operation.

FIG. 1A is a simplified perspective view of a vehicle 100, in accordance with some embodiments of the disclosure. The vehicle 100 may comprise, for example, a compact track loader, a skid steer loader, a skid steer and snow blower, an excavator, or any other type of vehicle or construction vehicle. However, the disclosure is not so limited and the vehicle 100 may comprise other types of vehicles than those described.

The vehicle 100 includes a body (e.g., frame) 102 supporting a motor (e.g., engine, such as a direct combustion engine, an electric motor) for providing power to the vehicle 100. The motor may be configured to generate motive power for facilitating movement of the vehicle 100 and may be in driving relationship with track assemblies 106. The track assemblies 106 are configured for facilitating movement of the vehicle 100 with respect to the ground. In other words, power from the motor is provided to the track assemblies 106 via a powertrain to provide movement of the vehicle 100. An operator may control the vehicle 100 from an operator cabin 108.

An apparatus 110 is coupled to the vehicle 100 and configured for performing one or more operations. The apparatus 110 may include, for example, a bulldozer blade. However, the disclosure is not so limited and the apparatus 110 may comprise, for example, a bucket, a backhoe, a fork, a grapple, a scraper pan, an auger, a saw, a ripper, a material handling arm, a snow blower, or any other tool that may be interchangeably coupled to the vehicle 100.

The track assemblies 106 may comprise an endless elastomeric track 112 disposed around a drive wheel 114, an idler wheel 116, and one or more roller wheels 118. The endless elastomeric track 112 may be referred to herein as an "endless track" or an "elastomeric track." The drive wheel 114 is rotated by power provided by the motor and rotation of the drive wheel 114 causes movement of the endless elastomeric tracks 112 on the ground. The idler wheel 116 and the roller wheels 118 guide the endless elastomeric tracks 112 and/or provide tension to the endless tracks 112 as the endless elastomeric tracks 112 are driven by the drive wheel 114.

Figure 1B:
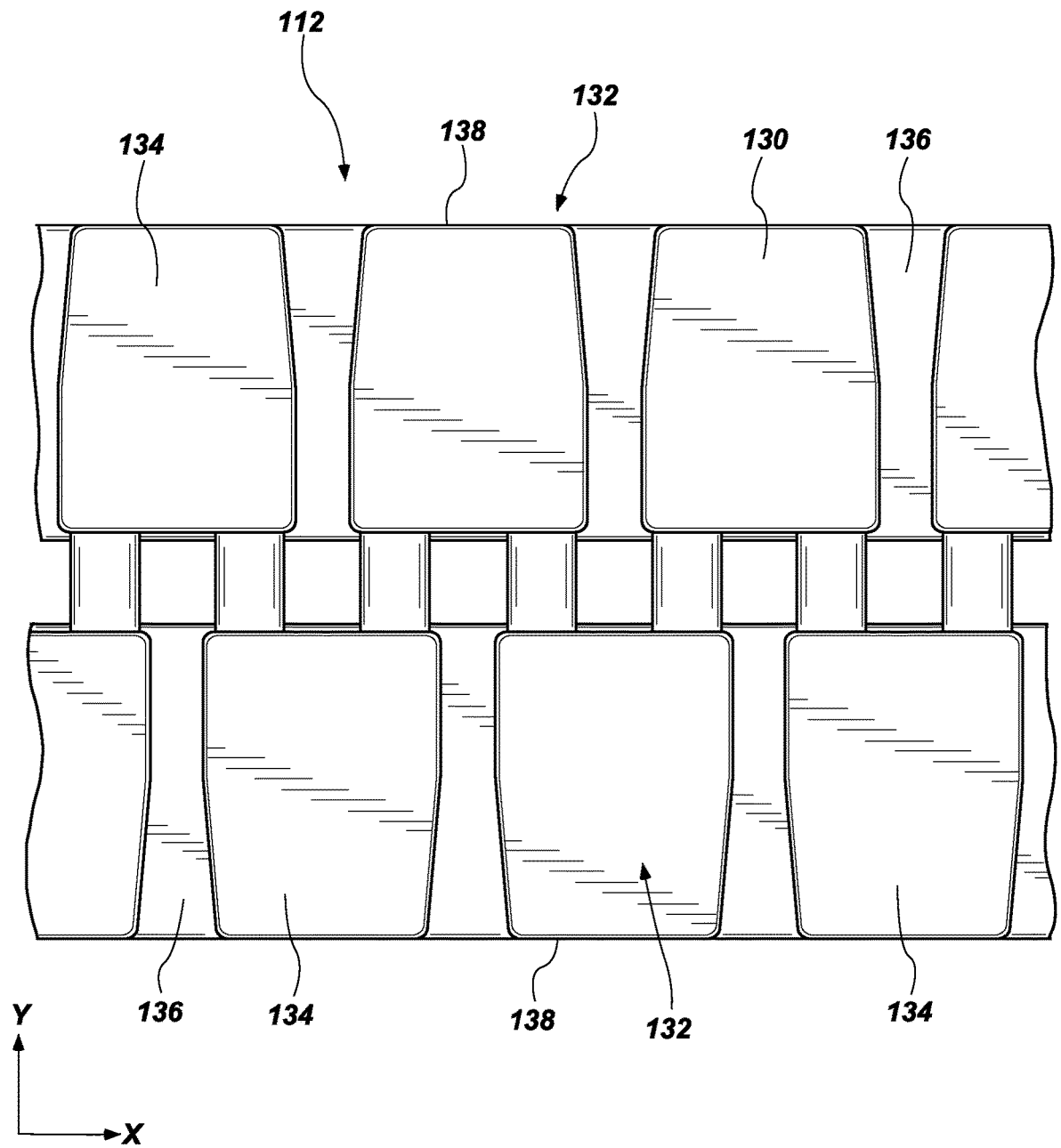
FIG. 1B is a simplified top view of an outer portion of an elastomeric endless track, in accordance with embodiments of the disclosure.

FIG. 1B is a simplified top view of an outer portion of one of the endless elastomeric tracks 112, in accordance with embodiments of the disclosure. The elastomeric track 112 may be formed of and include an elastomeric material. The elastomeric material may comprise, for example, a rubber material, such as, for example, one or more of a polyurethane elastomer, 1,4-polybutadiene elastomer, 1,4-polyisoprene rubber, chloroprene, acrylonitrile butadiene rubber (NBR), highly saturated nitrile rubber (HNBR), urethane rubber, carboxylated nitrile rubber, polybutadiene rubber, or styrene-butadiene rubber (SBR). However, the disclosure is not so limited and the elastomeric track 112 may include elastomeric materials other than, or in addition to, those described above.

The elastomeric track 112 comprises an outer (external) surface 130 configured to engage the ground during use and operation. The outer surface 130 may include a tread pattern 132 to facilitate traction on the ground. The tread pattern 132 may include projections 134 (which may also be referred to as "grousers") for contacting the ground. Recesses (e.g., channels, grooves) 136 may be located between adjacent projections 134. The elastomeric track 112 may include side portions 138 (e.g., portions of the elastomeric track 112 that do not contact the ground during use and operation of the elastomeric track 112).

As will be described herein, a traction device may be removably coupled to the elastomeric track 112 to facilitate improved traction of the elastomeric track 112 on surfaces such as, for example, snow, mud, ice, soft surfaces, or other surfaces, and, in particular, inclined surfaces. The traction device may couple to the side portions 138 of the elastomeric track 112 and may extend over the outer surface 130 of the elastomeric track 112, such as in the y-direction illustrated in FIG. 1B.

Figure 2A:
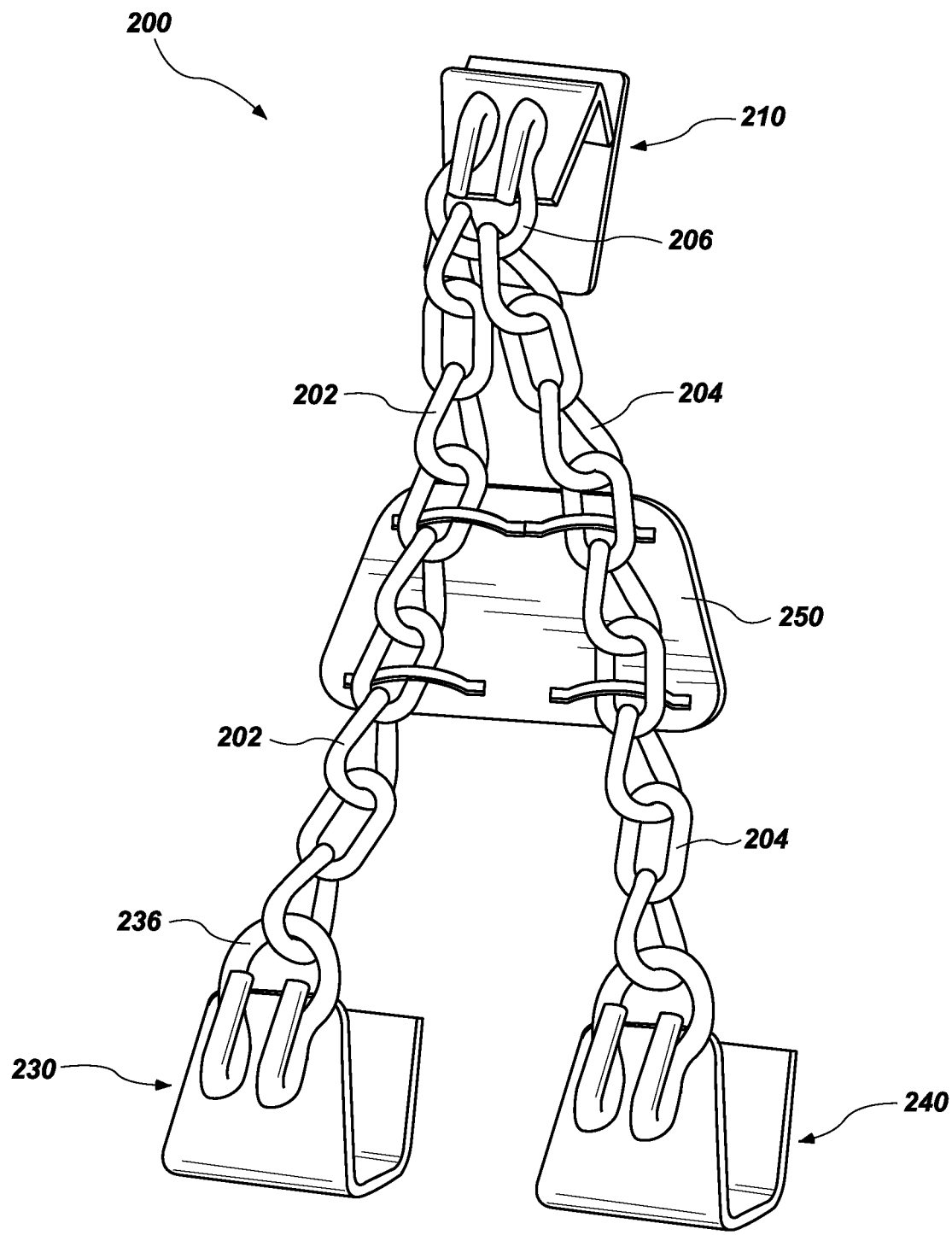
FIG. 2A and FIG. 2B are simplified perspective views of a traction device for an elastomeric track, in accordance with embodiments the disclosure.
Figure 2B:
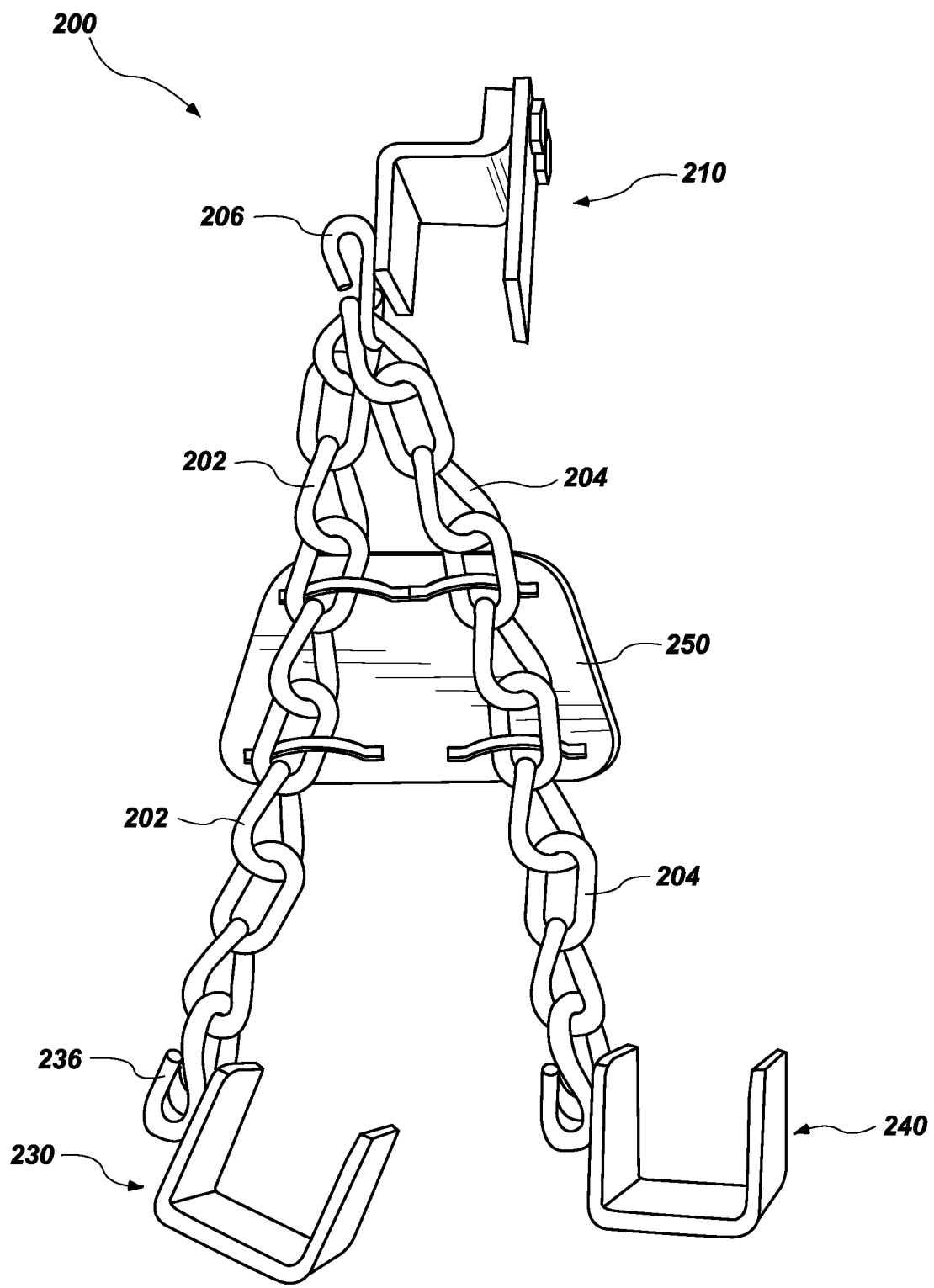

FIG. 2A and FIG. 2B are simplified perspective views of a traction device 200 for an elastomeric track (e.g., the elastomeric track 112 (FIG. 1A, FIG. 1B)), in accordance with embodiments of the disclosure. In some embodiments, the traction device 200 is configured for use with the elastomeric track, as opposed to, for example, a steel track.

The traction device 200 may include a first bracket 210, a first chain 202 operably coupled to the first bracket 210, a second bracket 230 operably coupled to the first chain 202, a second chain 204 between and operably coupled to the first bracket 210 and a third bracket 240, and a plate 250 coupled to the first chain 202 and the second chain 204, the plate 250 between the first bracket 210 and each of the second bracket 230 and a third bracket 240.

As will be described herein, each of the first bracket 210, the second bracket 230, and the third bracket 240 may define a channel (e.g., recess) sized and shaped to receive at least a portion of the elastomeric track 112 (FIG. 1A, FIG. 1B) for attaching the traction device 200 to the elastomeric track 112. In use and operation, the first bracket 210 may couple to side portions (e.g., side portions 138 (FIG. 1B)) of the elastomeric track 112 on a first side of the elastomeric track 112 and each of the second bracket 230 and the third bracket 240 may couple to the side portion of the elastomeric track 112 on a second side of the elastomeric track 112 opposite the first bracket 210. The first chain 202 and the second chain 204 may extend over the outer (external) surface (e.g., the outer surface 130) of the elastomeric track 112.

Figure 3A:
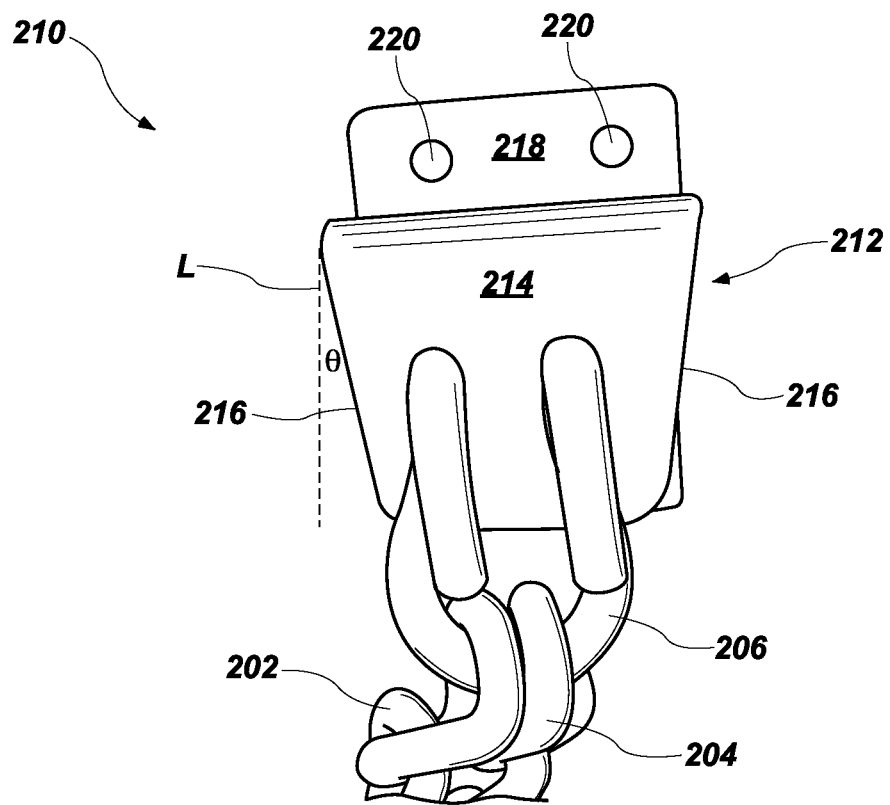
FIG. 3A and FIG. 3B are respectively a simplified top view and a simplified side view of a first bracket of the traction device of FIG. 2A and FIG. 2B, in accordance with embodiments of the disclosure.
Figure 3B:
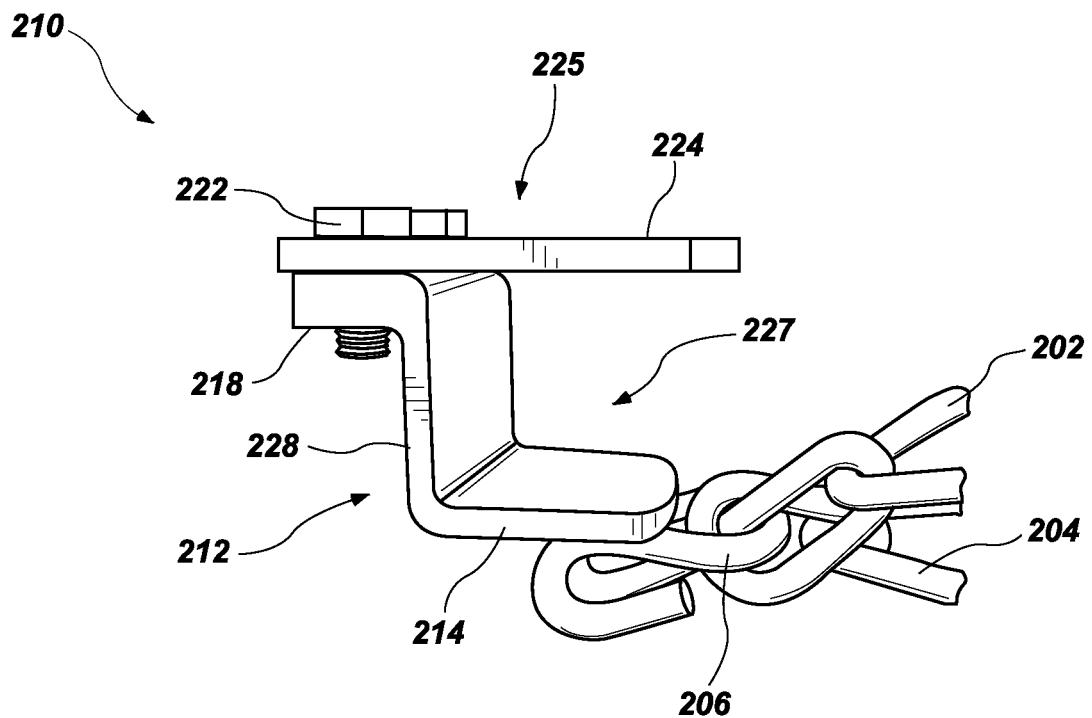

FIG. 3A is a simplified top view of the first bracket 210 and FIG. 3B is a simplified side view of the first bracket 210, in accordance with embodiments of the disclosure. Referring collectively to FIG. 3A and FIG. 3B, in some embodiments, the first bracket 210 includes a first portion 212 including a first surface 214 having tapered sides 216 (FIG. 3A) configured to interact with the recesses 136 (FIG. 1B) of the elastomeric track 112 (FIG. 1A, FIG. 1B), and a second portion 225 (FIG. 3B) comprising a second surface 224 (FIG. 3B) coupled to the first portion 212. In some embodiments, the first surface 214 and the second surface 224 are substantially planar. In some embodiments, the first surface 214 and the second surface 224 may be parallel with each other.

As shown in FIG. 3B, the first portion 212 includes the first surface 214 and a third surface 228. The third surface 228 may be substantially planar in some embodiments. The third surface 228 may be oriented substantially perpendicular to the first surface 214 and the second surface 224. The third surface 228 may be between the first surface 214 and the second surface 224 and may couple the first surface 214 to the second surface 224.

With reference to FIG. 3A, the first surface 214 may exhibit a size and shape corresponding to a size and shape of the recesses 136 (FIG. 1B) of the elastomeric track 112 (FIG. 1A, FIG. 1B). In other words, the tapered sides 216 may facilitate receipt of the first surface 214 within the recesses 136 of the elastomeric track 112. In some embodiments, the first surface 214 including the tapered sides 216 may form a wedge shape that facilitates forming a wedge fit between the first bracket 210 and the recesses 136 of the elastomeric track 112. As will be described herein, during use and operation, the tapered sides 216 of the first surface 214 may facilitate secure attachment of the first bracket 210 to the elastomeric track 112.

The first surface 214 may exhibit a trapezoidal shape, a triangular shape, a square shape, a rectangular shape, an elliptical shape, a polygonal shape (e.g., hexagonal), or another shape. In some embodiments, the first surface 214 exhibits a trapezoidal shape. The shape of the first surface 214 may depend upon the shape of the recesses 136 (FIG. 1B) of the elastomeric track 112 (FIG. 1A, FIG. 1B).

In some embodiments, an angle of the tapered sides 216 may correspond to an angle of recesses 136 (FIG. 1B) of the elastomeric track 112 (FIG. 1A, FIG. 1B). By way of non-limiting example, the tapered sides 216 may be extend (e.g., be oriented) at an angle θ from about 1° to about 30° with respect to an axis L that is parallel with an axis of symmetry of the first bracket 210. The axis L may be perpendicular to the third surface 228 (FIG. 3B) of the first bracket 210. The angle θ may be from about 1° to about 5°, from about 5° to about 10°, from about 10° to about 15°, from about 15° to about 20°, from about 20° to about 25°, or from about 25° to about 30° with respect to the axis L. In some embodiments, the angle θ is from about 15° to about 30°. In other embodiments, the angle θ is from about 1° to about 15°. However, the disclosure is not so limited and the angle θ may be other than those described above.

With reference to FIG. 3B, the first portion 212 may include a fourth surface 218 that may be substantially parallel to the first surface 214 and the second surface 224. In some embodiments, the fourth surface 218 is substantially planar. The fourth surface 218 may include openings (apertures) 220 (FIG. 3A) extending therethrough and configured to receive a coupling means (e.g., a bolt) 222. The second surface 224 may include corresponding openings 220 configured to receive the coupling means 222. The second portion 225 may be configured to be operably coupled to the first portion 212 with the coupling means 222. For example, bolts may be inserted into the openings 220 of the first portion 212 and the openings 220 of the second portion 225 and may couple the first portion 212 to the second portion 225. In some embodiments, the openings 220 are threaded and configured to threadably receive the coupling means 222. In other embodiments, the openings 220 are not threaded and the first portion 212 is coupled to the second portion 225 with coupling means 222 comprising bolts and nuts.

When coupled together, the first portion 212 and the second portion 225 may form a U-shaped channel 227 sized and shaped to receive at least a portion of the elastomeric track 112 (FIG. 1A, FIG. 1B). For example, side portions 138 (FIG. 1B) of the elastomeric track 112 may be received within the U-shaped channel 227 for coupling the first bracket 210 to the elastomeric track 112.

As will be described herein, coupling the first portion 212 to the second portion 225 may facilitate placement of the first bracket 210 on an elastomeric track 112 (FIG. 1A, FIG. 1B) without placing a bolt or coupling means through the elastomeric track 112 and without utilizing a pry bar and hammer (e.g., such as by forcing a traction device over the elastomeric track with the pry bar and hammer).

With continued reference to FIG. 3A and FIG. 3B, along with reference again to FIG. 2A, the first bracket 210 may be operably coupled to the first chain 202. For example, the first bracket 210 may be welded to the first chain 202. In some embodiments, a ring 206 is coupled to the first bracket 210 and the first chain 202 is coupled to the ring 206. In some embodiments, the ring 206 is welded to the first portion 212 and the first bracket 210, such as at the first surface 214. In other embodiments, the first chain 202 is directly attached to the first bracket 210. For example, the first chain 202 may be welded directly to the first bracket 210.

The first chain 202 may extend between the first bracket 210 and the second bracket 230. The first chain 202 may be operably coupled to the second bracket 230 in substantially the same manner as the first chain 202 is coupled to the first bracket 210.

Figure 4A:
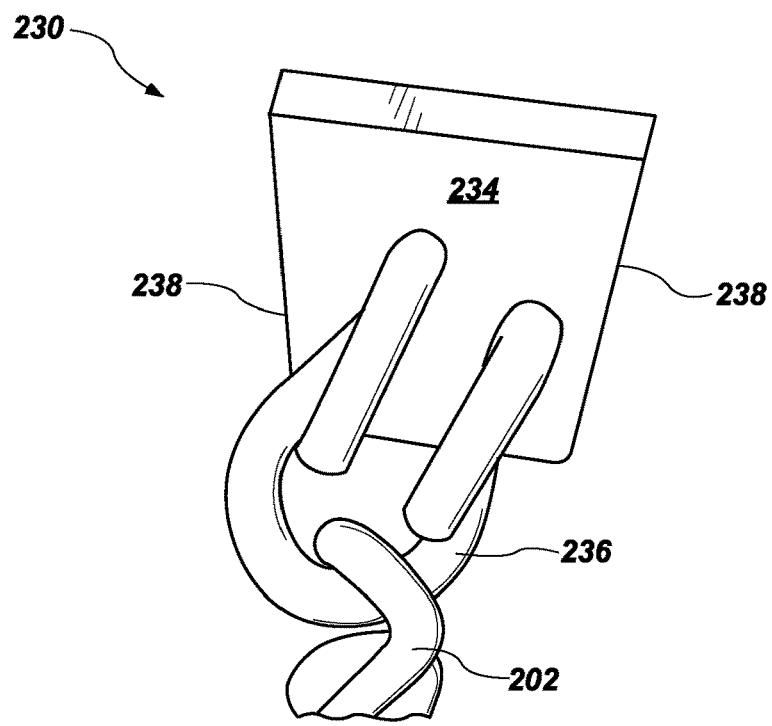
FIG. 4A and FIG. 4B are respectively a simplified top view and a simplified side view of a second bracket of the traction device of FIG. 2A and FIG. 2B, in accordance with embodiments of the disclosure.
Figure 4B:
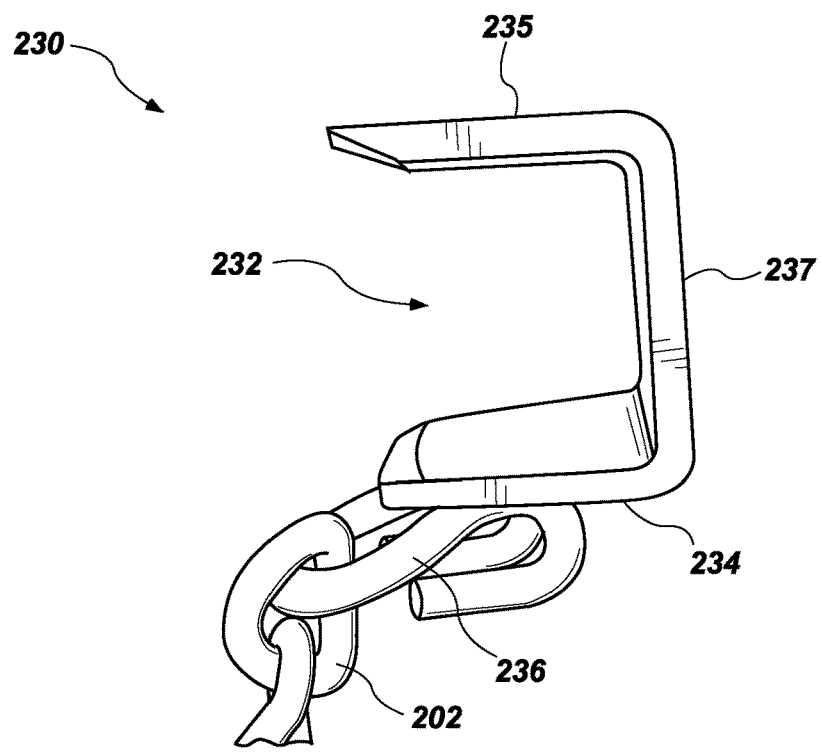

FIG. 4A is a simplified top view of the second bracket 230 and FIG. 4B is a simplified side view of the second bracket 230, in accordance with embodiments of the disclosure. A ring 236 may be coupled to the second bracket 230 and may also be coupled to the first chain 202. The ring 236 may facilitate attachment of the first chain 202 to the second bracket 230. In some embodiments, the ring 236 is welded to the second bracket 230 and the first chain 202 is welded to the ring 236, as described above with reference to the ring 206 (FIG. 3A, FIG. 3B) and the first bracket 210 (FIG. 3A, FIG. 3B).

The second bracket 230 may be substantially the same as the first bracket 210, except that the second bracket 230 may comprise a single unitary body. In other words, the second bracket 230 may comprise an integral member. The second bracket 230 may include a first surface 234, a second surface 235 opposite the first surface 234, and a third surface 237 between and coupling the first surface 234 and the second surface 235. In some embodiments, the first surface 234, the second surface 235, and the third surface 237 are substantially planar. In some embodiments, the first surface 234 is substantially parallel with the second surface 235 and the third surface 237 is substantially perpendicular to the first surface 234 and the second surface 235.

The first surface 234, the second surface 235, and the third surface 237 may define a U-shaped channel 232 sized and shaped to fit around the elastomeric track 112 (FIG. 1A, FIG. 1B) for coupling the traction device 200 (FIG. 2A, FIG. 2B) to the elastomeric track 112.

The first surface 234 may include tapered sides 238 (FIG. 4A) sized and shaped to correspond to recesses 136 (FIG. 1B) of the elastomeric track 112 (FIG. 1A, FIG. 1B), as described above with reference to the first surface 214 including the tapered sides 216. The tapered sides 238 may extend at an angle from about 1° to about 30° with respect to an axis that is perpendicular to the third surface 237. The tapered sides 238 may extend at an angle from about 1° to about 30° with respect to an axis that is parallel with an axis of symmetry of the second bracket 230, as described above with reference to the tapered sides 216 of the first bracket 210 (FIG. 3A, FIG. 3B).

The second surface 235 (FIG. 4B) may be configured to contact an underside of the elastomeric track 112 (FIG. 1A, FIG. 1B) in use and operation. The second surface 235 may correspond generally to the second surface 224 of the first bracket 210. As will be described herein, in some embodiments, the length of the first chain 202 may correspond about to a width of the elastomeric track 112 (e.g., a dimension of the elastomeric track 112 in the y-direction in FIG. 1B). In some embodiments, the first chain 202 has a length that is greater than the width of the elastomeric track 112.

With reference back to FIG. 2A and FIG. 2B, the traction device 200 includes the third bracket 240. The third bracket 240 may be substantially similar to the second bracket 230 and may include, for example, a U-shaped channel sized and shaped to receive a portion of the elastomeric track 112 (FIG. 1A, FIG. 1B) for coupling the traction device 200 to the elastomeric track 112.

Figure 5A:
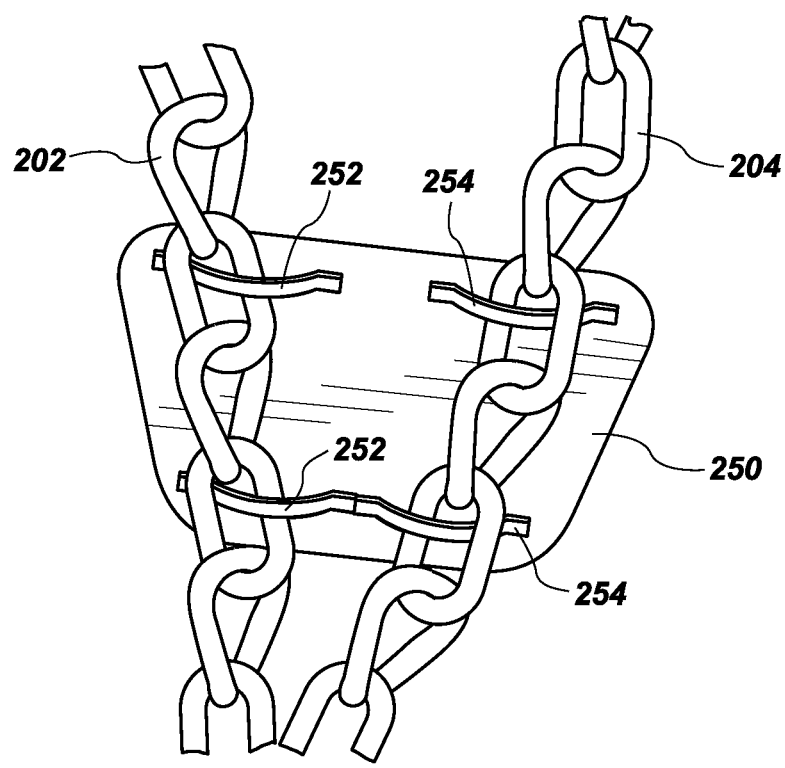
FIG. 5A is a simplified top view of a plate illustrating a first chain and a second chain coupled to the plate, in accordance with embodiments of the disclosure.

Each of the first chain 202 and the second chain 204 may be coupled to the plate 250. FIG. 5A is a simplified top view of the plate 250 illustrating the first chain 202 and the second chain 204 coupled to the plate 250, in accordance with embodiments of the disclosure. The plate 250 may be configured to substantially prevent the first chain 202 and the second chain 204 from pushing (e.g., falling) into the recesses 136 (FIG. 1B) of the elastomeric track 112 (FIG. 1A, FIG. 1B) and may facilitate contact between the ground and each of the first chain 202 and the second chain 204. As will be appreciated, portions of the first chain 202 and/or the second chain 204 that may otherwise push (e.g., fall) into the recesses 136 would reduce the contact between the ground and each of the first chain 202 and the second chain 204 and would lessen the traction of the elastomeric track 112. In other words, the plate 250 facilitates improved contact between the ground and each of the first chain 202 and the second chain 204.

The plate 250 may facilitate separation of the first chain 202 from the second chain 204. In some embodiments, the plate 250 includes a coupling means 252 for coupling the first chain 202 to the plate 250. The coupling means 252 may include, for example, an aperture through which a portion of a link of the first chain 202 is passed to couple the first chain 202 to the plate 250. The coupling means 252 may comprise, for example, a loop including an opening to receive the at least a portion of the link of the first chain 202. In some embodiments, the coupling means 252 is welded to the plate 250. In other embodiments, the coupling means 252 is attached to the plate 250, such as by, for example, a threaded connection. By way of non-limiting example, the coupling means 252 may be attached to the plate 250 with a nut and bolt connection. In some embodiments, the coupling means 252 comprises a U-bolt connection. In some embodiments, the U-bolt connection is welded to the plate 250.

Although FIG. 5A illustrates two coupling means 252 for coupling the first chain 202 to the plate 250, the disclosure is not so limited. In other embodiments, the first chain 202 may be coupled to the plate 250 at only a single location. In yet other embodiments, the first chain 202 is coupled to the plate 250 at more than two (e.g., three, four, five, six) locations.

The plate 250 may further include additional coupling means 254 for operably coupling the second chain 204 to the plate 250. The additional coupling means 254 may be substantially the same as the coupling means 252.

Although FIG. 5A illustrates that the first chain 202 is coupled to the plate 250 with different (separate) coupling means 252 than the coupling means 254 for coupling the second chain 204 to the plate 250, the disclosure is not so limited. In other embodiments, the first chain 202 and the second chain 204 each independently include a portion that is coupled to the same coupling means for attaching the first chain 202 and the second chain 204 to the plate 250.

The plate 250 may exhibit a trapezoidal shape, a square shape, a rectangular shape, an elliptical shape, a circular shape, a triangular shape, or another shape. In some embodiments, the plate 250 exhibits a trapezoidal shape. With reference to FIG. 2A and FIG. 2B, in some embodiments, a relatively shorter side of the plate 250 may be located more proximate to the first bracket 210 than a relatively longer side of the plate 250. For example, a relatively shorter side of the trapezoidal shape of the plate 250 may be located more proximate to the first bracket 210 than the relatively longer side of the trapezoidal shape. In some such embodiments, a relatively longer side of the plate 250 may be located more proximate to the second bracket 230 and the third bracket 240 than to the first bracket 210.

Figure 5B:
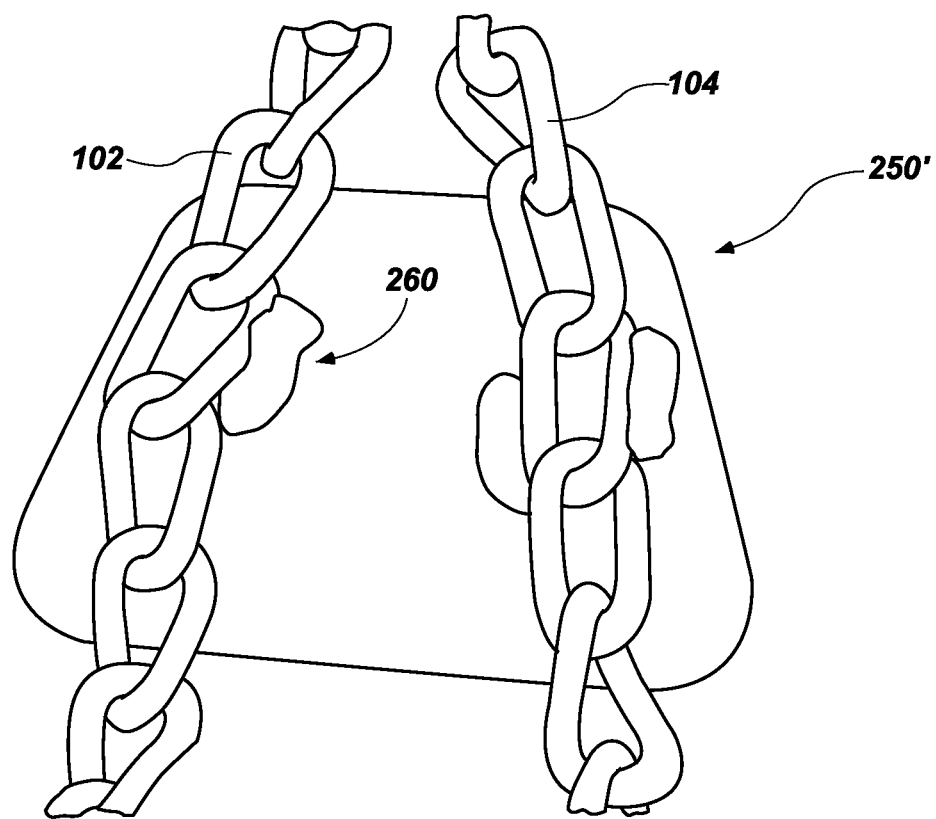
FIG. 5B is a simplified top view of a plate of the traction device of FIG. 2A and FIG. 2B, in accordance with other embodiments of the disclosure.

Although FIG. 5A illustrates that the first chain 202 and the second chain 204 are coupled to the plate 250 with respective coupling means 252, 254, the disclosure is not so limited. FIG. 5B is a top view of a plate 250', in accordance with other embodiments of the disclosure. Each of the first chain 202 and the second chain 204 are attached to the plate 250' without a coupling means 252, 254 (FIG. 5A). For example, the first chain 202 and the second chain 204 may be directly welded to the plate 250' at location 260. In some embodiments, only a single link of the first chain 202 and a single link of the second chain 204 is welded to the plate 250' to facilitate free movement of other portions of the first chain 202 and the second chain 204 over the elastomeric track 112 (FIG. 1A, FIG. 1B). In other embodiments, one or both of the first chain 202 and the second chain 204 are welded to the plate 250' at more than one location (e.g., more than one link) of the respective one of the first chain 202 and the second chain 204.

Figure 6:
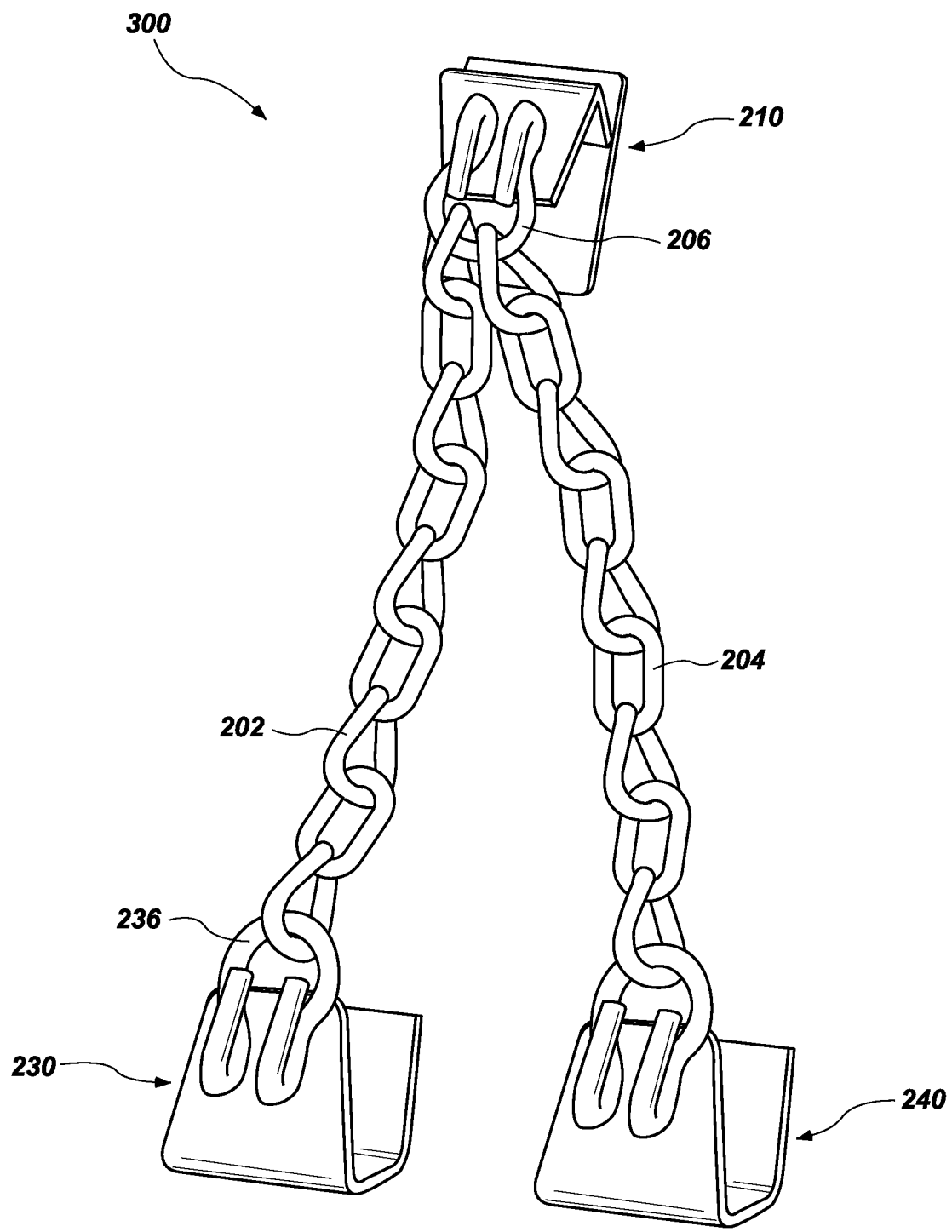
FIG. 6 is a simplified perspective view of a traction device for an elastomeric track, in accordance with some embodiments.

Although the traction device 200 of FIG. 2A through FIG. 5B has been described and illustrated as including the plate 250, the disclosure is not so limited. In other embodiments, a traction device according to embodiments of the disclosure may not include a plate. FIG. 6 is a simplified perspective view of a traction device 300 for an elastomeric track, in accordance with embodiments of the disclosure. The traction device 300 may be substantially the same as the traction device 200 described above with reference to FIG. 2A through FIG. 5B, except that the traction device 300 may not include the plate 250 (FIG. 2A, FIG. 2B, FIG. 5A, FIG. 5B). Accordingly, in some embodiments the traction device 300 does not include a plate.

In other embodiments, the first chain 202 and the second chain 204 may be separated by means of, for example, a bar or a rod. For example, a bar may attached to the first chain 202 and may be coupled to the second chain 204 and configured to space the first chain 202 from the second chain 204. The bar may be attached to the first chain 202 and the second chain 204 at locations corresponding to, for example, the location of the plate 250 (FIG. 5A). However, the bar may have a smaller dimension (e.g., height, width) compared to the plate. In other words, the bar may have a smaller dimension across the width of the elastomeric track 112 in the y-direction.

Although the traction devices 200, 300 have been described and illustrated as including the first chain 202 and the second chain 204, the disclosure is not so limited. In some embodiments, the traction device includes only a single chain (e.g., the first chain 202). In some such embodiments, the traction device does not include, for example, the third bracket 240. In some such embodiments, the traction device may include the plate 250 or may not include the plate 250.

Figure 7A:
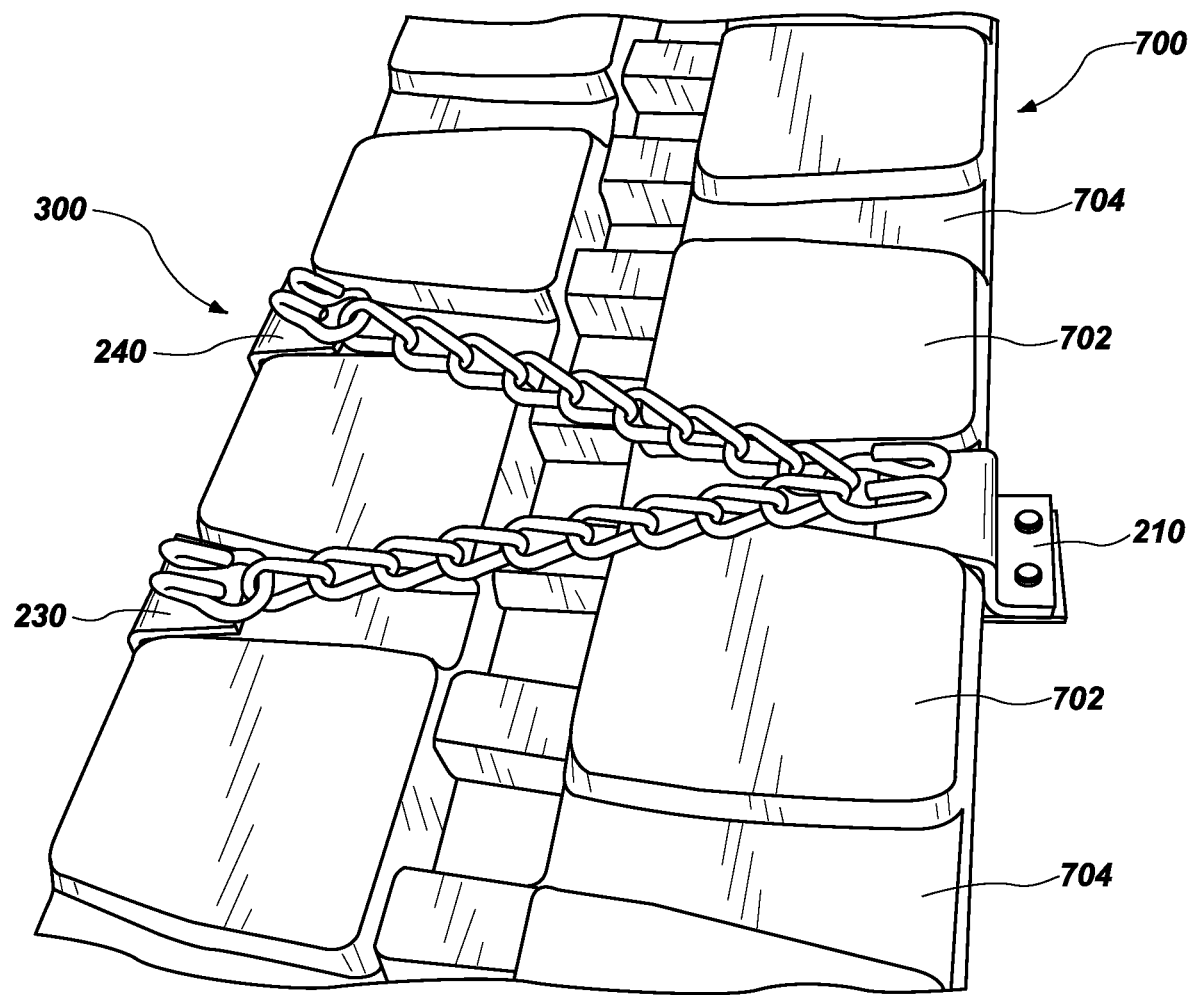
FIG. 7A is a perspective view illustrating a traction device operably coupled to an elastomeric track, in accordance with embodiments of the disclosure.
Figure 7B:
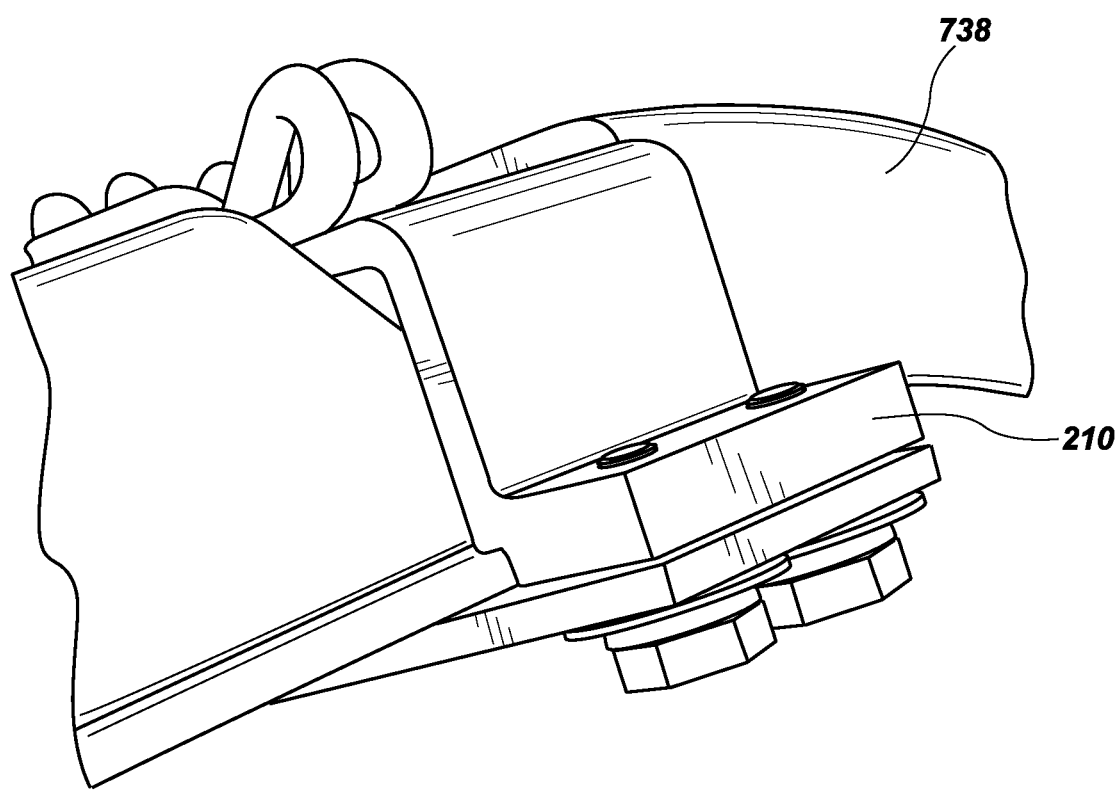
FIG. 7B is a side view illustrating the traction device operably coupled to the elastomeric track, in accordance with embodiments of the disclosure.

FIG. 7A is a perspective view illustrating the traction device 300 operably coupled to an elastomeric track 700, in accordance with embodiments of the disclosure. FIG. 7B is a side view illustrating the traction device 300 operably coupled to the elastomeric track 700. The elastomeric track 700 may be substantially similar to the elastomeric track 112 described above with reference to FIG. 1A and FIG. 1B. The elastomeric track 700 may include, for example, projections (e.g., grousers) 702 and recesses 704 located between the projections. While FIG. 7A depicts the traction device 300 as operably coupled to the elastomeric track 700, the traction device 200 (FIGS. 2A and 2B) may be operatively coupled to the elastomeric track 700 in a similar manner. If present, the traction device 200 (FIGS. 2A and 2B) may be operatively coupled to the elastomeric track 700 instead of or in combination with the traction device 300.

The traction device 300 may be coupled to the elastomeric track 700 by, for example, coupling the second bracket 230 and the third bracket 240 to a first side of the elastomeric track 700. The U-shaped channels 232 of the second bracket 230 and the third bracket 240 may receive side portions 738 the elastomeric track 700. Accordingly, the first surface 214 may contact an outer surface (e.g., the outer surface 130 (FIG. 1B)) of the elastomeric track 700, the second surface 224 may contact a lower (inner) surface of the elastomeric track 700, and the third surface 228 may contact side portions 738 of the elastomeric track 700 (e.g., portions of the elastomeric track 700 between the inner surface and the outer surface).

After placing the second bracket 230 and the third bracket 240 over the elastomeric track 700, the first bracket 210 may be placed over the elastomeric track 700. By way of non-limiting example, the first portion 212 of the first bracket 210 may be separated from the second portion 225. The first portion 212 may be placed on the outer surface and the side portions 738 of the elastomeric track 700 (e.g., the first surface 214 may be placed on the outer surface and the third surface 228 may be placed on the side portions 738 of the elastomeric track 700). The openings 220 may extend beyond the side portions 738 of the elastomeric track 700. The openings 220 of the second surface 224 may be placed on the lower (inner) surface of the elastomeric track 700 and aligned with the openings 220 of the first portion 212. The first portion 212 may be coupled to the second portion 225 with the coupling means 222 to attach the first bracket 210 to the elastomeric track 700 and complete installation of the traction device 300 to the elastomeric track 700.

Accordingly, the traction devices 200, 300 may be installed on the elastomeric track without drilling holes through the elastomeric track and without forcing the traction devices 200, 300 over the elastomeric track with a pry bar and hammer, as may be the case for conventional traction enhancement devices. Drilling holes in the elastomeric track may substantially reduce the life expectancy and the integrity of the elastomeric track. Use of a pry bar to install conventional traction enhancement devices may damage the conventional traction enhancement devices to fit over the elastomeric track and, when the conventional traction enhancement devices are installed, the traction enhancement devices may not fit properly, thus becoming loose and disconnecting from (e.g., fall off of) the elastomeric track during operation. In addition, installation of the traction devices 200, 300 may take less time than installation of conventional traction enhancement devices, which may require drilling holes in the elastomeric track and/or use of a pry bar and hammer to compress the elastomeric track and fit the traction device over the elastomeric track.

In some embodiments, an elastomeric track (e.g., the elastomeric track 112 (FIG. 1A, FIG. 1B), the elastomeric track 700) may include more than one of the traction devices 200, 300. A number of traction devices 200, 300 installed on an elastomeric track may depend upon, among other things, one or more of the length of the elastomeric track, the conditions (e.g., an incline (angle) of the terrain, snow, mud, ice, sand, soft surfaces, wet surfaces) in which the vehicle 100 associated with the elastomeric track is operating, and the weight of the vehicle 100.

In some embodiments, the elastomeric track may include one or more traction device(s) 200, 300 for every from about three linear feet to about ten linear feet of the elastomeric track. For example, the elastomeric track may include one traction device 200, 300 for every from about three linear feet to about five linear feet, for every from about five linear feet to about seven linear feet, or for every from about seven linear feet to about ten linear feet. However, the disclosure is not so limited and the elastomeric track may include fewer or more traction devices 200, 300 than that described above.

In use and operation, as the elastomeric track is driven to propel the vehicle, the traction devices 200, 300 may interact with the ground (e.g., mud, snow, ice, sand, wet surfaces, soft surfaces, and angled surfaces) and increase the friction between the elastomeric track and the ground and substantially reduce or prevent incidents of slippage of the vehicle. In some embodiments, the wedge shape of the traction device 200, 300 caused by the lateral separation of the first chain 202 from the second chain 204 may increase the traction of the associated elastomeric track in both the X-direction (e.g., left and right in the view of FIG. 7A) and the Y-direction (e.g., up and down in the view of FIG. 7A). It is believed that the separation of the first chain 202 from the second chain 204 in the Y-direction (e.g., along a length of the elastomeric track) increases the traction of the elastomeric track in the Y-direction, while the individual chains 202, 204 that extend across the width (in the X-direction) elastomeric track in both the X-direction and the Y-direction increase the traction of the elastomeric track in both the X-direction and the Y-direction. In other words, it is believed that the first chain 202 and the second chain 204 extending across the width of the elastomeric track at an angle relative to each other increases the traction of the elastomeric track in both the X-direction and the Y-direction. Stated in yet another way, the first chain 202 and the second chain 204 extend at an angle other than perpendicular with respect to the edge (e.g., edge 738 (FIG. 7B)) of the elastomeric track, which improves the traction of the elastomeric track in the X-direction and the Y-direction. Accordingly, since the first chain 202 and the second chain 204 are not substantially parallel with each other across the width of the elastomeric track, the traction of the elastomeric track is improved in both the X-direction and the Y-direction (e.g., across the width of the elastomeric track and along a length of the elastomeric track).

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A traction device for an elastomeric track, the traction device comprising:
a first bracket having a first portion, a tapered surface, and a second portion, the second portion configured to be removably coupled to the first portion to define a U-shaped channel configured to receive at least a portion of an elastomeric track;
a first chain coupled to the first bracket at a first end of the first chain;
a second bracket coupled to a second end of first chain opposite the first bracket; and
a plate coupled to the first chain between the first bracket and the second bracket.

2. The traction device of claim 1, wherein the second bracket comprises a single integral material.

3. The traction device of claim 1, wherein the tapered surface comprises a trapezoidal shape.

4. The traction device of claim 1, wherein the plate comprises a loop and the first chain comprises a link, a portion of the link passing through the loop.

5. The traction device of claim 1, wherein the tapered surface comprises a tapered side angled with respect to an axis of symmetry of the first bracket.

6. The traction device of claim 5, wherein the angle of the tapered side is from about 1° to about 15°.

7. The traction device of claim 1, wherein the first portion and the second portion comprise openings configured to receive a bolt for removably coupling the first portion to the second portion.

8. The traction device of claim 1, further comprising a second chain coupled to the plate, a first end of the second chain coupled to the first bracket and a second, opposite end of the second chain coupled to a third bracket.

9. The traction device of claim 8, further comprising a ring coupling the first bracket to each of the first chain and the second chain.

10. The traction device of claim 1, wherein the second bracket defines a U-shaped channel configured to receive a portion of the elastomeric track.

11. The traction device of claim 1, wherein the plate comprises a trapezoidal shape.

12. A traction device for an elastomeric track, the traction device comprising:
a first bracket having a first portion and a second portion, the second portion operably attached to the first portion, the first portion and the second portion defining a U-shaped channel sized and shaped to receive a portion of an elastomeric track, the first portion comprising a tapered surface corresponding to recesses of the elastomeric track;
a first chain coupled to the first bracket; and
a second bracket having an integral member defining a U-shaped channel, the second bracket coupled to the first chain.

13. The traction device of claim 12, further comprising a second chain between the first bracket and a third bracket.

14. The traction device of claim 13, wherein the second chain is adjacent the first chain at the first bracket and spaced from the first chain at locations distal from the first bracket.

15. The traction device of claim 12, wherein the second bracket comprises a tapered surface.

16. The traction device of claim 12, wherein the tapered surface comprises angled sides oriented at an angle with respect to the second portion of the first bracket.

17. The traction device of claim 16, wherein the first portion comprises openings for receiving bolts to couple the first portion to the second portion.

18. The traction device of claim 12, further comprising a plate between the first bracket and the second bracket, the plate coupled to the first chain.

19. A method of attaching a traction device to an elastomeric track, the method comprising:
   placing at least a portion of an elastomeric track within a U-shaped channel of a second bracket of a traction device, the traction device comprising:
      a first bracket having a tapered surface, a first portion, and a second portion, the second portion configured to be removably coupled to the first portion to define a U-shaped channel and configured to receive at least a portion of an elastomeric track;
      a first chain coupled to the first bracket at a first end of the first chain;
      the second bracket coupled to a second end of the first chain opposite the first bracket; and
      a plate coupled to the first chain between the first bracket and the second bracket;
   placing the first portion adjacent to an outer surface and a side surface of the elastomeric track;
   placing the second portion adjacent to an inner surface of the elastomeric track; and
   coupling the first portion to the second portion while a portion of the elastomeric track is within a recess defined by the first portion and the second portion.

20. The method of claim 19, wherein coupling the first portion to the second portion comprises fastening the first portion to the second portion with bolts that do not extend through the elastomeric track.

\* \* \* \* \*